United States Patent Office 3,029,148
Patented Apr. 10, 1962

3,029,148
PROCESS FOR TREATMENT OF PROTEINACEOUS ALBUMINOUS FOODS OF ANIMAL ORIGIN
Ulrich Zboralski, Mainz (Rhine), Germany, assignor to Victor Chemical Works, Chicago, Ill., a corporation of Illinois
No Drawing. Filed Mar. 14, 1958, Ser. No. 721,359
2 Claims. (Cl. 99—169)

This invention relates to the treatment of proteinaceous foods suitable for human consumption and the food products produced therefrom. This treatment comprises applying to the surfaces of proteinaceous foods, such as exemplified by cheese, meat and sausage products, constituents that react with the albuminous constituents present at the surfaces of such foods, and resins.

Many processes have been described which are concerned with the problem of preventing losses resulting from the occurrence of drying in albumin-containing substances in order to increase their stability, without, however, reaching a satisfactory solution to this problem, despite the great economic significance of this problem. For example, it is a known practice to coat foods with plastic dispersions in such a manner that a resistant, supple film forms around the material treated. The film produced by such known processes gives the material treated a packed or attractive appearance and provides a certain amount of protection against losses through drying and mechanical strains.

It has proved, however, that with foods such as cheeses and sausages, which must pass through a certain ripening process, these films can lead to a serious deterioration of the quality of the product during storage. Thus, for example, cheeses and unsmoked raw sausages have a tendency to form a smear or mold on their surfaces, which is normally removed at short intervals by salting or washing. The smear is composed of a multitude of microorganisms, of which a part is capable of growing either under aerobic or under anaerobic conditions and of decomposing the albumin-containing surfaces with the aid of their fermentation system. Up to a certain stage of ripening, these processes are even necessary in order to give the cheese or the raw sausage aroma and special character. However, if this smear or mold deposit is not interrupted in time, defective and, finally, spoiled products result.

It has been found that these processes cannot be essentially influenced by the application of film-forming plastic dispersions onto the surface of such comestible products; and often after a short storage period, a damaging, irremovable smear or mold deposit can be observed under the coating. In most cases the film becomes detached from the surface of the food and loses its transparency and flexibility and the food itself becomes very unfavorably altered in its appearance and taste. There is also the disadvantage that foods treated by such a process will have an unappetizing effect when they are cut since the film tends to tear or crumble in the cutting, whereby more or less large parts of the coating hang out over the surface of the line of cut or adhere to the parts that have been cut and are intended for prompt consumption. In addition, it has been found that such films are not sufficiently resistant to mechanical strains and that in shipping or in a subsequent handling of the food, (e.g., removal of mold that has grown on the film) it tears easily or can easily be damaged.

According to the present invention, these disadvantages are obviated by applying to the surfaces of proteinaceous foods suitable for human consumption an admixture of a synthetic resin and a constituent or additive that reacts with the albuminous constituents present at said surfaces, or first applying a constituent that reacts with said albuminous constituents and then applying the synthetic resin. Both procedures should be conducted in such a manner as to cause a more effective bonding between the surface of the food and the resulting film.

The synthetic resin may comprise a bath containing polyvinylchloride-polyvinylidene chloride and nondeleterious solvent such as water, as well as other suitable resinous systems. Aqueous dispersions of the polyvinylchloride-polyvinylidene chloride product set forth in U.S. Patent 2,245,742 may be used.

Suitable additives are, in particular, organic and/or inorganic acids or their salts, or derivatives that are not injurious to health. Alkali (e.g., alkali metal) salts of such acids are especially good. Of the organic and inorganic acids, citric acid and phosphoric acid, respectively, come into particular consideration because of the excellent results effected therewith. Excellent results may be obtained with the salts (e.g., alkali or alkali metal salts) of orthophosphoric acid; better results are obtained with the salts (e.g., alkali or alkali metal salts) of condensed phosphoric acids, such as pyro-, poly- and metaphosphoric acids. The treatment of the present invention may be carried out once or a desired number of times. It may consist, for example, in brushing, spraying or dipping the comestible product in the processing liquid(s).

The procedure wherein an admixture of reactive additive and resin or plastic is applied to the surface of the food will first be hereinafter discussed and illustrated with examples.

By applying such additives or materials that are suitable for reacting with the albumin-containing components of the surface, especially, in the case of cheeses, condensed phosphates, a melted cheese layer is produced which provides protection against defects in the rind, such as discolorations, drying, as well as providing against defects in ripening, smear deposit, etc. An equalization of the surface is also attained with such additives, whereby an especially uniform and attractive coating may be achieved with the plastic dispersion. Furthermore, in some cases, especially with fresh natural cheeses, the rind layer of the surface is steeped and, accordingly, an intimate mixing with the aqueous plastic dispersion and reactive additive may be accomplished. After the drying of the surface of suitable kinds of cheese, a thin layer of slightly dissolved rind components and plastic having remarkable mechanical resistance is formed; this layer is solidly or integrally joined or bonded with the cheese paste and may be removed only by cutting it away with the entire rind layer. In my new process the formation of a dense coating is attained, whereby it is possible, for example, to dispense with subsequent pasteurization.

A food treated according to the process of the present invention, such as, for example, cheese, effects a possible attachment of smear or mold on the surface only, which effect, however, in contrast to untreated cheese or one treated only with pure plastic dispersion or a cheese treated only with phosphate solution, is not capable of effectively attaching or bonding to the underlying rind layers and therefore effects a premature spoiling of the food. Because of the special properties of the surface of the food that is treated in accordance with the present invention, such an attack can be easily removed. At the same time, an effective protection against rind faults is achieved. Also, the treatment of cheeses in the cellar, which includes salting, washing, turning, etc., may be facilitated by the employment of the process of the present invention without causing any disadvantageous appearance of the cheese. When cheeses are treated in accordance with the present invention and are cut, they are appetizing and clean, and a tearing or crumbling of the rind is avoided. Furthermore, the solidly closed rind layer provides surprising stability against drying and the shrinkage losses associated therewith. When the present invention is used, it is frequently possible to dispense with further, customary packing measures such as waxing and/or sealing the food product with foils.

In many cases it is appropriate to apply a phosphate-containing plastic dispersion at elevated temperatures up to about 100° C. This may be accomplished in various manners, as, for example, by coating the cheeses with a hot solution of phosphate-containing plastic dispersions, or by warming the cheese with hot water or other heat conductors before the treatment.

Further, it is appropriate to add to the plastic dispersion substances which deter or prevent the growth of bacteria and mold. Carboxylic acids are especially suitable for this purpose, such as, for example, acetic acid, lactic acid, propionic acid, sorbic acid, etc. For the preservation of flavor it is advantageous to add antioxidants and synergists, such as ascorbic acid, whereby a premature decomposition of the fat is avoided.

Another procedure that has proved very favorable for the formation of a stable rind layer is the application of heat to the partially or fully dried plastic dispersion, whereby it is possible to treat the coated cheese in hot-air or steam cabinets or with hot water. It was also possible to obtain good results with an infrared heating.

It is also possible to add to the plastic dispersion physiologically unobjectionable coloring substances, in order, for example, to dispense with coating cheeses (e.g., Edam cheeses, Gouda cheeses, etc.) with yellow or red wax. Some plastic dispersions tend to foam and do not, therefore, yield homogeneous coatings on the surfaces; in these cases, it is appropriate to add to the plastic dispersion familiar antifoam agents (e.g., alcohols).

The treatment of sausages by the process of the present invention is carried out in principle exactly as was described above for cheeses. However, extensive experiments show it is advantageous, in the present invention, to adjust the mixture of plastic dispersion and additives to a pH-value of less than 4 in order to obtain better soaking of the skin.

The process of the present invention may also be applied to cut surfaces, for example, sausages and pieces of ham which serve for display purposes, in order to avoid a premature graying. This effect may be reinforced by adding substances to the plastic dispersion that are used for the reddening of raw sausages and ham (e.g., saltpeter, nitrites, sugar, etc.). Especially good results are obtained, however, with additions of ascorbic and nicotinic acid, in which process it is possible, without difficulty, to use these substances in mixture with ordinary reddening agents or alone.

As far as objects, the surfaces of which were treated in accordance with the present invention, are considered for human consumption, it is important to use only non-deleterious substances which can be reacted with albumin-containing surface components.

The process of the present invention may be illustrated with the following examples wherein the surface of the food is treated with mixtures containing a film-forming plastic dispersion plus an additive which reacts with the albumin-containing components present at the surface of the food being treated:

*Example I*

Several 6-day-old Edam cheeses are dipped for 30 seconds in 90° C. hot water and, after removal, are wiped with a clean cloth. To the still hot and somewhat damp surface, there is vigorously applied with a brush a prepared solution comprising 75% of an aqueous, film-forming plastic dispersion, free of softeners, and 25% of a 20% potassium pyrophosphate solution (pH=6.5). After about an hour, the plastic dispersion has dried with the rind into a uniform, homogeneous layer.

After 3 more weeks of storage in the ripening cellar, the cheeses showed a shrinkage saving of about 50% in comparison with untreated cheeses. The cellar treatment was considerably facilitated by the resistant surface.

*Example II*

Several fully ripened raw sausages, filled into natural skins, are dipped into a highly fluid, aqueous plastic dispersion and hung up to dry. The plastic dispersion is film-forming under 15° C., has good moistening properties, is free of softeners, and, before the dipping, it is adjusted with 6% by weight of urea phosphate to a pH under 3. The sausages had an excellent luster after the drying and after several weeks of storage they were still juicy and fresh, whereas the untreated control sausages had a hard consistency and tasted old. The soaking of the natural skin by an extremely acid setting of the plastic dispersion brought about an especially solid connection of the plastic film with the surface of the skin. By this measure, the clarity of the film is especially favored, and, furthermore, a heightened protection is achieved against mechanical strains and surface faults.

As indicated above, it has also been discovered that in many cases equally good results, and in part better results, may be achieved if the above-described process of the present invention is conducted so that the surfaces of the comestible food products are first treated with the above-mentioned additives which are suited for reacting with the albumin-containing surface components, and then coated with film-forming plastic in such a manner that a smooth, cohesive film is formed on the surface of the food. For example, particularly with very fresh, green cheeses, which still have a very moist surface, the plastic dispersion does not dry or it remains milky and does not form a clear film; in such cases, no effective protection is achieved against influences of the environment and only an unsatisfactory saving of shrinkage is accomplished. On many foods, for example, cheeses, a plastic film may be applied only when they have attained a certain age. However, the earlier the treatment with film-forming plastic dispersions takes place, the more the juiciness and freshness of the food can be preserved. By placing such food products in a salt bath so that a dry surface develops after drying, it is possible to effectively coat even green cheeses having moist surfaces with plastic forming dispersions. By this preliminary treatment with substances capable of reacting with the albumin-containing surface components, a smooth, dry surface is quickly obtained, on which it is possible to apply a faultless plastic film.

When the proteinaceous comestible products are first treated with additives which are able to react with the albumin-containing surface component, these additives may be applied to said surfaces in dry form or in solution. This treatment may be carried out, preferably, at room or cellar temperature, but also at higher temperatures. Independently of these temperatures, the plastic dispersion may be applied and dried at temperatures especially suitable for this purpose.

Also, additives for the deterring or stoppage of mold growth for the preservation of the flesh color and of the coloring of the surfaces may be employed in the manner previously described; these additives may be mixed and applied both with the plastic dispersion and also with the additives which are used to react with the albumin-containing surface components.

The following examples illustrate the use of the above-described preliminary treatment in which the plastic dispersion is applied to food products that are first treated with an additive that is applied for reaction with the albumin-containing surface components:

*Example III*

Several green Edam cheeses are placed directly from the salt bath in a 10% aqueous solution of a mixture of 50% sodium pyrophosphate and 50% sodium tripolyphosphate (pH=6.5) for 2 hours at 20° C. The cheeses are then taken out and allowed to lie overnight at a room temperature of about 20° C. on dry, clean cheese boards, being turned a number of times. Here, the dissolved-on, sticky rind layer dries to a thin coating, which gives the cheese an advantageous, smooth and dry surface.

Onto these cheeses subjected to this preliminary treatment an aqueous, film-forming plastic dispersion, free of softeners, is applied in such a manner that first one side is treated and, after its drying, the cheese is turned and the other side is coated. This coating is repeated in the same manner.

Because of the smooth quality of the pre-treated surface, less plastic dispersion is used than on natural surfaces; furthermore, an especially uniform and thick plastic film forms.

*Example IV*

A number of thoroughly ripened raw sausages (in natural skins), approximately eight days old, are placed for 30 minutes in a 5% lactic acid solution and, after drying, they are painted with a plastic dispersion described in Example III, supra.

Because of the preliminary swelling (steeping) of the skin with lactic acid, in conjunction with the drying of a film-forming plastic dispersion, an increased protection is achieved in respect to faults in ripening. The shrinkage losses were reduced by more than 60% by the high imperviousness of the plastic film to water vapor.

The foregoing detailed description has been given for clearness of understanding only, and no unnecessary limitations should be understood therefrom, as modifications will be obvious to those skilled in the art.

I claim:

1. The method of treating proteinaceous, albuminous foods of animal origin suitable for human consumption comprising applying to the surfaces of said foods an additive that reacts with the albuminous constituents present at the surfaces thereof, said additive being selected from the group consisting of phosphoric acids and alkali salts thereof, and a liquid film-forming synthetic organic plastic, whereby a uniform, clear coating is formed that is firmly affixed to said surfaces and serves to afford protection against drying and mechanical strains.

2. The method of claim 1 wherein the food treated is a member of the group consisting of meat and cheese products.

References Cited in the file of this patent

UNITED STATES PATENTS

| | | |
|---|---|---|
| 2,611,708 | Owens et al. | Sept. 23, 1952 |
| 2,733,151 | Zuercher | Jan. 31, 1956 |
| 2,811,453 | Childs | Oct. 29, 1957 |
| 2,856,294 | Brown et al. | Oct. 14, 1958 |